US008509482B2

(12) United States Patent
Tsuji

(10) Patent No.: US 8,509,482 B2
(45) Date of Patent: Aug. 13, 2013

(54) SUBJECT TRACKING APPARATUS, SUBJECT REGION EXTRACTION APPARATUS, AND CONTROL METHODS THEREFOR

(75) Inventor: Ryosuke Tsuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 12/964,334

(22) Filed: Dec. 9, 2010

(65) Prior Publication Data

US 2011/0150280 A1    Jun. 23, 2011

(30) Foreign Application Priority Data

Dec. 21, 2009  (JP) ................................. 2009-289653
Dec. 24, 2009  (JP) ................................. 2009-293207

(51) Int. Cl.
  *G06K 9/00*    (2006.01)
(52) U.S. Cl.
  USPC .......................................................... 382/103
(58) Field of Classification Search
  None
  See application file for complete search history.

(56) References Cited

U.S. PATENT DOCUMENTS

| 6,687,386 | B1 | 2/2004 | Ito et al. | |
|---|---|---|---|---|
| 7,573,505 | B2 | 8/2009 | Kawaguchi et al. | |
| 2003/0108223 | A1* | 6/2003 | Prokoski | 382/115 |
| 2004/0066970 | A1* | 4/2004 | Matsugu | 382/217 |
| 2007/0031004 | A1* | 2/2007 | Matsui et al. | 382/103 |
| 2009/0052741 | A1* | 2/2009 | Abe | 382/103 |
| 2009/0141937 | A1* | 6/2009 | Abe | 382/103 |
| 2010/0007758 | A1* | 1/2010 | Abe et al. | 348/222.1 |

FOREIGN PATENT DOCUMENTS

| JP | 09-185708 A | 7/1997 |
|---|---|---|
| JP | 2001-060269 | 3/2001 |
| JP | 2005-318554 | 11/2005 |
| JP | 2008-123416 A | 5/2008 |
| JP | 2009-027402 A | 2/2009 |

OTHER PUBLICATIONS

The above references were cited in a Nov. 22, 2012 Japanese Office Action, which is enclosed without English Translation, that issued in Japanese Patent Application No. 2012-231184.
The above reference was cited in a Oct. 18, 2012 Japanese Office Action, which is enclosed without English Translation, that issued in Japanese Patent Application No. 2009-289653 and its Divisional application No. 2012-231184.
Iain Matthews et al. "The Template Update Problem (2003)", IEEE Transactions on Pattern Analysis and Machine Intelligence, Dec. 31, 2003.
The above article was cited in a Sep. 26, 2012 Chinese Office Action, which is enclosed with an English Translation, that issued in Chinese Patent Application No. 201010608338.7.

* cited by examiner

*Primary Examiner* — Stephen R Koziol
*Assistant Examiner* — Delomia Gilliard
(74) *Attorney, Agent, or Firm* — Cowan, Liebowitz & Latman, P.C.

(57) ABSTRACT

A subject tracking apparatus which performs subject tracking based on the degree of correlation between a reference image and an input image is disclosed. The degree of correlation between each of a plurality of reference images based on images input at different times, and the input image is obtained. If the maximum degree of correlation between a reference image based on a first input image among the plurality of reference images and the input image is equal to or higher than a threshold, a region with a maximum degree of correlation with a first reference image is determined as a subject region. Otherwise, a region with a maximum degree of correlation with a reference image based on an image input later than the first input image is determined as a subject region.

9 Claims, 12 Drawing Sheets

FRAME t = 2

FRAME t = 4

FRAME t = 1

FRAME t = 3

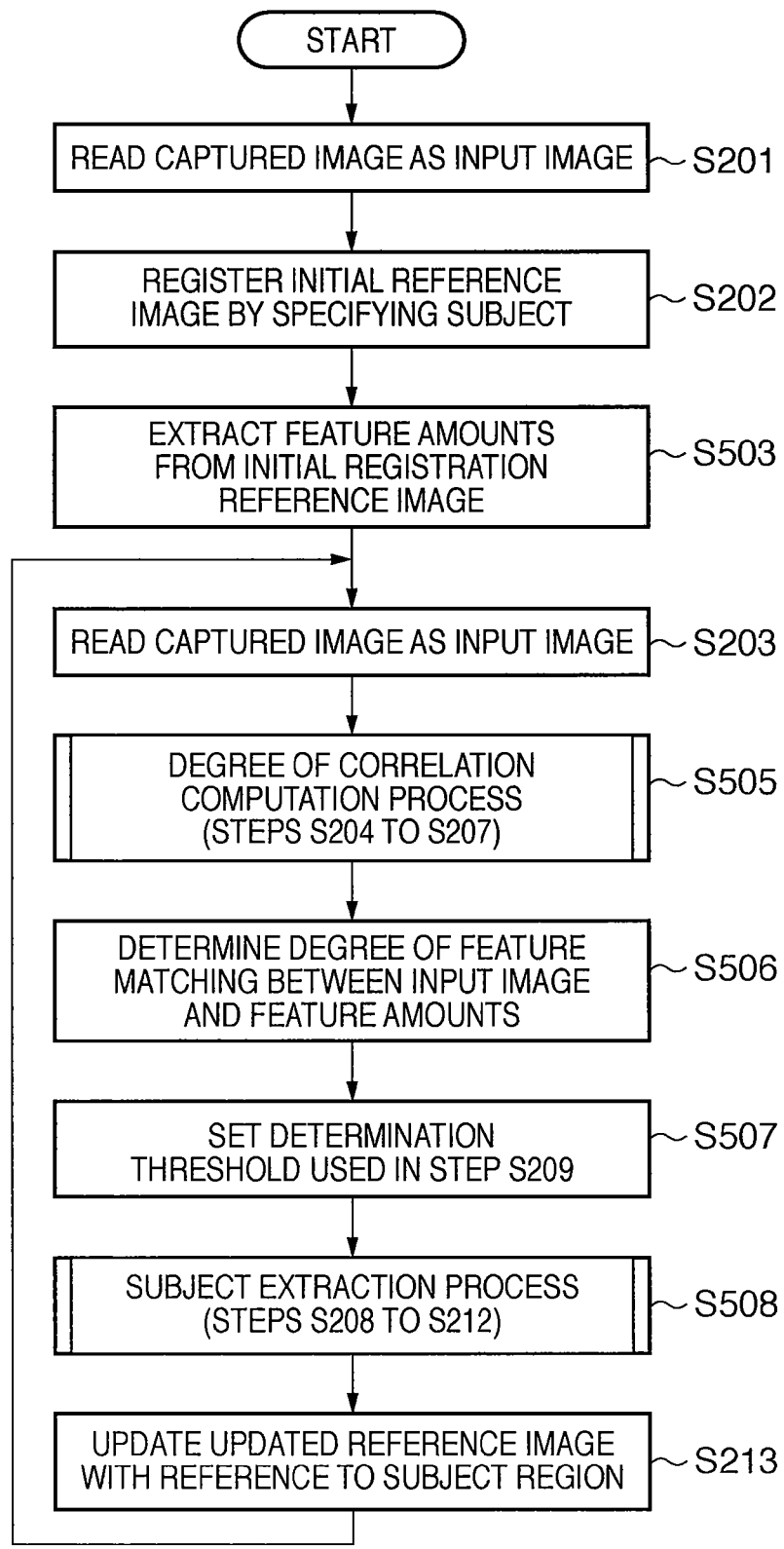

INITIAL REFERENCE IMAGE

HUE HISTOGRAM OF INITIAL REFERENCE IMAGE

FRAME t = n

IMAGE BINARIZED BY FEATURE AMOUNTS CORRESPONDING TO FRAME t = n

FRAME t = m

IMAGE BINARIZED BY FEATURE AMOUNTS CORRESPONDING TO FRAME t = m

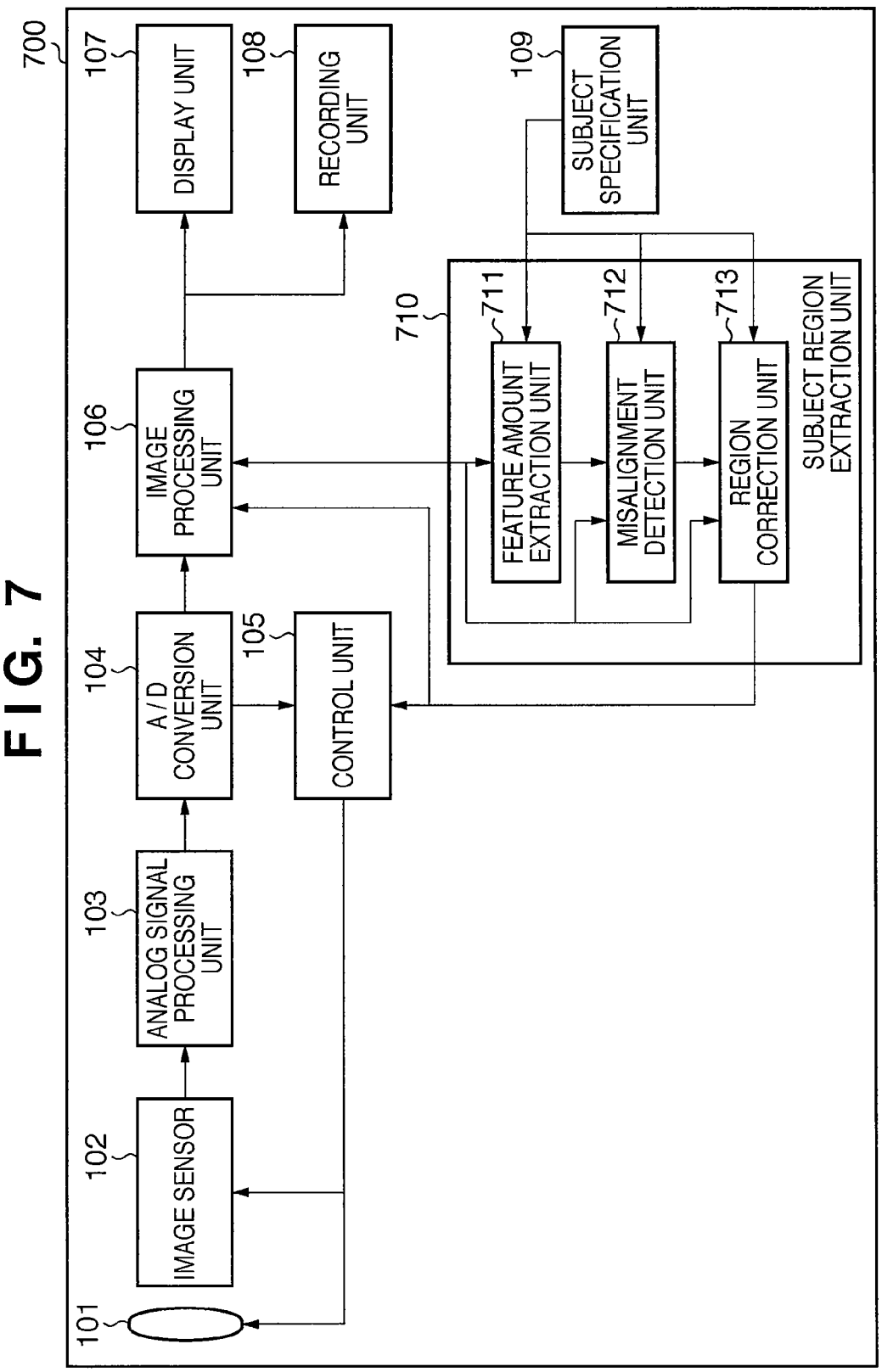

INPUT IMAGE INDICATING
SPECIFIED REGION

IMAGE BINARIZED BY
FEATURE AMOUNT

IMAGE OBTAINED BY
DIVIDING SPECIFIED REGION

SUBJECT EXTRACTION
RESULT IMAGE

SUBJECT TRACKING APPARATUS, SUBJECT REGION EXTRACTION APPARATUS, AND CONTROL METHODS THEREFOR

BACKGROUND OF THE INVENTION

1. Field of the Invention

The present invention relates to a subject tracking apparatus, a subject region extraction apparatus, and control methods therefor.

2. Description of the Related Art

An image processing technique of detecting a specific subject in one frame of images that are sequentially supplied in time series, and tracking the detected subject in subsequent frames, is very useful. A technique of detecting and tracking a human body region (for example, a face region) in a moving image, for example, can be employed in a wide variety of fields such as a conference call, a man-machine interface, security, a monitor system for tracking a specific subject, and image compression. Some digital cameras and digital video cameras which incorporate this image processing technique are known to execute exposure control and focus control so as to appropriately capture a subject specified in the image displayed on an electronic viewfinder.

For example, Japanese Patent Laid-Open No. 2005-318554 discloses an image capturing apparatus which detects a face from a captured image, focuses on the face, and captures an image of the face with an exposure optimum for the face. Also, Japanese Patent Laid-Open No. 2001-60269 discloses a tracking process in which a face detected in a certain frame is detected in subsequent frames.

A method which uses a template matching technique, as disclosed in Japanese Patent Laid-Open No. 2001-60269, is known to track a specific subject, detected in a certain frame, in subsequent frames. Template matching is a technique of extracting an image of a subject to be tracked (a template image or a reference image) from a certain frame (to be referred to as a reference frame hereinafter) of a moving image, and searching for a region with a highest degree of correlation with the template image in subsequent frames. The found region is presumed as the position of the template image in each of the subsequent frames, thereby making it possible to track the subject corresponding to the template image.

In a subject tracking method which uses template matching, a subject is tracked based on the degree of correlation between a frame image to be tracked and a reference image (template image). Hence, the subject can be tracked with high accuracy in that method as long as it is captured in the frame image to be tracked in the same way as in the reference image.

However, if, for example, the subject is the face of a person and the face orientation may change or the face may be shielded by a physical object, the tracking accuracy may degrade due to the use of the same reference image. To achieve tracking robust against a change in visual aspect of the subject in the image, it is desirable that the reference image is updated in accordance with the change in visual aspect of the subject.

For example, it is possible to update the reference image so that a region with the highest degree of correlation with the reference image in a frame image to be tracked is used as a new reference image. However, in this method, if the subject is temporarily hidden behind a physical object, a region different from the subject is used as the reference image in the next tracking process, so the subject cannot be precisely tracked in subsequent frames.

Also, it is possible for the above-mentioned reference image to be specified by the user. In this case, the user specifies a region, to be used as a reference image, via an input device which allows him or her to specify an arbitrary region in a frame image, such as a touch panel. With this configuration, the user can easily specify tracking of a specific subject.

Although the reference image desirably contains the subject region to be tracked without any excess and deficiency, the user does not always specify it as such. If a region specified by the user shifts from the intended subject region or is unnecessarily larger than the subject region, the reference image includes images unnecessary for tracking, such as the background, in large amounts. When the subject is tracked using such a reference image which includes unwanted images in large amounts, the subject tracking accuracy may degrade as a region different from the target region may be tracked due to the influence of factors associated with the unwanted images.

SUMMARY OF THE INVENTION

The present invention has been made in consideration of the above-mentioned problems of the prior art.

The present invention provides a subject tracking apparatus and a control method therefor, which perform subject tracking based on the degree of correlation between a reference image and an input image and in which the subject tracking accuracy is improved even when the visual aspect of a subject changes.

The present invention also provides a technique of determining and extracting a subject region appropriate to be used as a reference image from a specified image region in a subject tracking apparatus and a control method therefor, which perform subject tracking based on the degree of correlation between a reference image and an input image.

According to an aspect of the present invention, there is provided a subject tracking apparatus which tracks a specific subject in an image over a plurality of images input thereto in time series, comprising: computation unit configured to obtain, with respect to each of a plurality of reference images registered in registration unit, a maximum degree of correlation of the input image and a region which is included in the input image and has the maximum degree of correlation; and first determination unit configured to determine a region of the specific subject in the input image from the regions obtained by the computation unit, wherein the plurality of reference images include a first reference image which is based on a region specified as the region of the specific subject in a first input image among the plurality of input images and is not updated, and a second reference image which is updated based on a region determined as the region of the specific subject by the first determination unit in each of a plurality of second input images, that are input to the subject tracking apparatus in time series later than the first input image, among the plurality of input images, and the first determination unit determines that a region with a maximum degree of correlation with the first reference image is the region of the specific subject in the input image if the maximum degree of correlation obtained with respect to the first reference image by the computation unit is not less than a predetermined threshold, and determines that a region with a maximum degree of correlation with the second reference image is the region of the specific subject in the input image if the maximum degree of correlation obtained with respect to the first reference image by the computation unit is less than the predetermined threshold.

According to another aspect of the present invention, there is provided a control method for a subject tracking apparatus which tracks a specific subject in an image over a plurality of images input thereto in time series, comprising: a computation step of obtaining, with respect to each of a plurality of reference images registered in registration unit, a maximum degree of correlation of the input image and a region which is included in the input image and has the maximum degree of correlation; and a first determination step of determining a region of the specific subject in the input image from the regions obtained in the computation step, wherein the plurality of reference images include a first reference image which is based on a region specified as the region of the specific subject in a first input image among the plurality of input images and is not updated, and a second reference image which is updated based on a region determined as the region of the specific subject in the first determination step in each of a plurality of second input images, that are input to the subject tracking apparatus in time series later than the first input image, among the plurality of input images, and in the first determination step, it is determined that a region with a maximum degree of correlation with the first reference image is the region of the specific subject in the input image if the maximum degree of correlation obtained with respect to the first reference image in the computation step is not less than a predetermined threshold, and it is determined that a region with a maximum degree of correlation with the second reference image is the region of the specific subject in the input image if the maximum degree of correlation obtained with respect to the first reference image in the computation step is less than the predetermined threshold.

According to further aspect of the present invention, there is provided a subject region extraction apparatus which extracts a predetermined subject region from an image, comprising: specification unit configured to specify a region including the predetermined subject from the image; extraction unit configured to extract a feature amount of the predetermined subject from the region specified by the specification unit; detection unit configured to detect a misalignment of a position of the predetermined subject in the specified region, based on a distribution of feature pixels which match the feature amount of the predetermined subject included in the specified region; and correction unit configured to correct a position of the specified region so that the misalignment of the position of the predetermined subject in the specified region reduces, wherein the extraction unit extracts the feature amount using at least one of a hue component and brightness component of each pixel within the specified region, and extracts the feature amount again upon changing a ratio, at which the hue component and brightness component are weighted, in accordance with color information obtained from the subject.

According to yet further aspect of the present invention, there is provided a subject tracking apparatus comprising: a subject region extraction apparatus defined in claim 7; and unit configured to register a reference image for use in subject tracking, based on the extraction result obtained by the subject region extraction apparatus, wherein a subject region is extracted in accordance with a degree of correlation between a partial region of a supplied image and the registered reference image.

According to another aspect of the present invention, there is provided a control method for a subject region extraction apparatus which extracts a predetermined subject region from an image, comprising: a specification step of specifying a region including the predetermined subject from the image; an extraction step of extracting a feature amount of the predetermined subject from the specified region; a detection step of detecting a misalignment of a position of the predetermined subject in the specified region, based on a distribution of feature pixels which match the feature amount of the predetermined subject included in the specified region; and a correction step of correcting a position of the specified region so that the misalignment of the position of the predetermined subject in the specified region reduces, wherein in the extraction step, the feature amount is extracted using at least one of a hue component and brightness component of each pixel within the specified region, and the feature amount is extracted again upon changing a ratio, at which the hue component and brightness component are weighted, in accordance with color information obtained from the subject.

With this configuration, according to an aspect of the present invention, the subject tracking accuracy is improved even when the visual aspect of a subject changes in a subject tracking apparatus and a control method therefor, which perform subject tracking based on the degree of correlation between a reference image and an input image.

According to another aspect of the present invention, an appropriate region can be extracted as a reference image even if, for example, the specified region and the position of the subject in the image shift from each other.

Further features of the present invention will become apparent from the following description of exemplary embodiments with reference to the attached drawings.

BRIEF DESCRIPTION OF THE DRAWINGS

FIG. 5 is a flowchart showing a subject tracking process according to the second embodiment of the present invention;

FIG. 7 is a block diagram showing an example of the functional configuration of an image capturing apparatus as an example of a subject tracking apparatus according to the third embodiment of the present invention;

DESCRIPTION OF THE EMBODIMENTS

Exemplary embodiments of the present invention will now be described in detail in accordance with the accompanying drawings. Note that the embodiments to be described hereinafter are intended to foster a better understanding of the present invention, so they do not limit the scope of the present invention, and can be changed into various forms within the scope of the present invention. Also, although the present invention is applied to image capturing apparatuses in the following embodiments, an image capturing function is not indispensable for the present invention, and any source of images to undergo subject tracking may be used. Hence, the present invention is widely applicable to image processing apparatuses which read out and play back or display recorded images, or externally receive and process images. Such image processing apparatuses include a variety of devices such as a personal computer, a personal digital assistant, a portable telephone, and a media player.

First Embodiment

Figure 1:
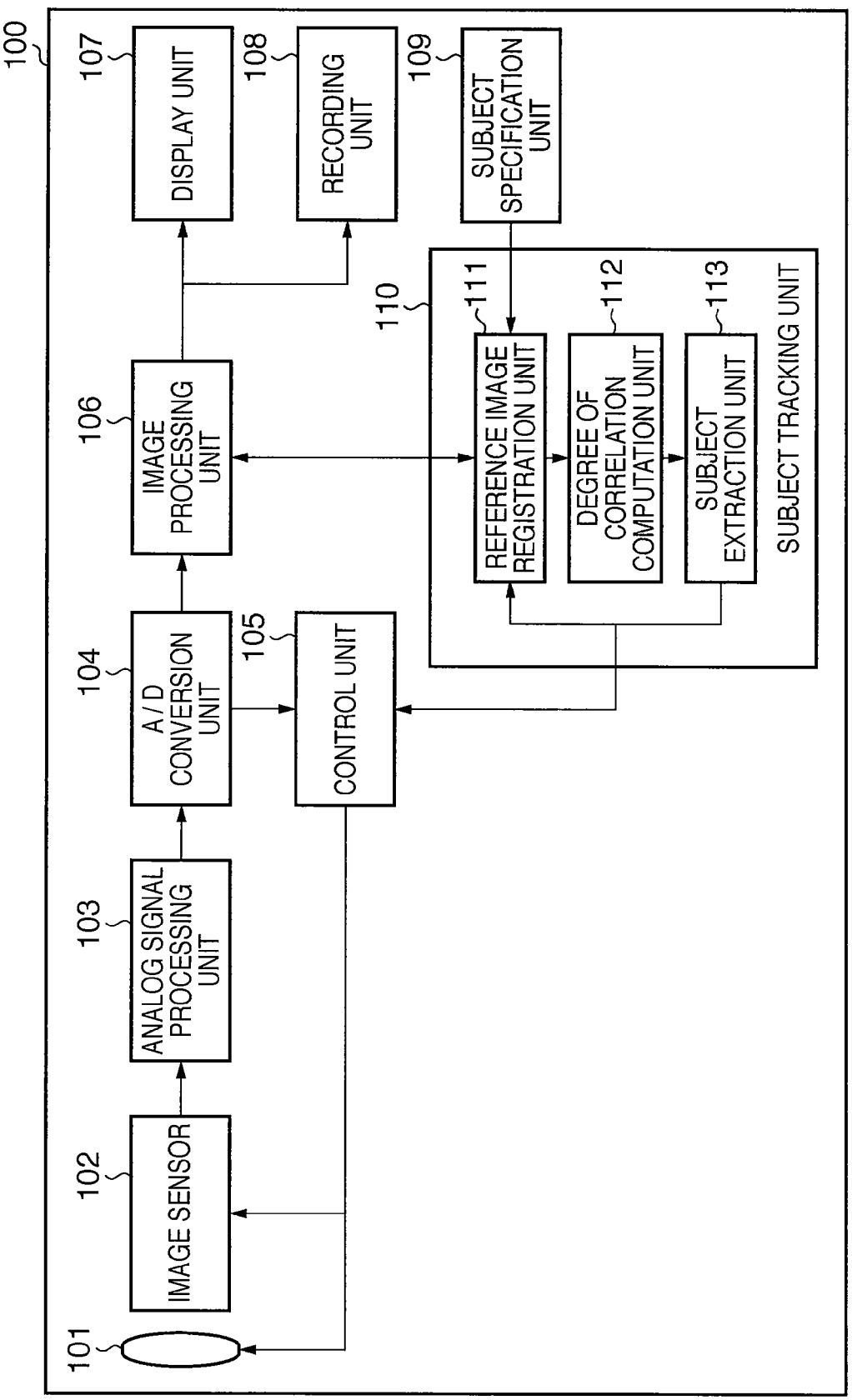
FIG. 1 is a block diagram showing an example of the functional configuration of an image capturing apparatus as an example of a substrate tracking apparatus according to the first embodiment of the present invention.

FIG. 1 is a block diagram showing an example of the functional configuration of an image capturing apparatus 100 as an example of a subject tracking apparatus according to the first embodiment of the present invention. A lens unit 101 is an imaging optical system, and generally includes a plurality of lenses including a focus adjustment lens. The lens unit 101 forms an optical image of a subject on the image sensing surface of an image sensor 102. The image sensor 102 is a photoelectric conversion element such as a CCD image sensor or a CMOS image sensor, and converts the optical image of the subject into an electrical signal for each pixel. This electrical signal is an analog video signal indicating the subject image captured by the image sensor 102. The image sensor 102 can output video signals in time series at a predetermined frame rate by continuously repeating image capture and output. An "image" in the following description is synonymous with a video signal of one frame.

The image output from the image sensor 102 undergoes analog signal processing such as CDS (Correlation Double Sampling) by an analog signal processing unit 103, is converted into the format of digital data by an A/D conversion unit 104, and is input to a control unit 105 and an image processing unit 106.

The control unit 105 is, for example, a CPU (Central Processing Unit) or a microcontroller, and controls the overall operation of the image capturing apparatus 100. More specifically, the control unit 105 controls each unit of the image capturing apparatus 100 by developing program codes stored in a ROM (Read Only Memory) into the working area of a RAM (Random Access Memory), and sequentially executing them. Note that the control unit 105 may include one or a plurality of CPUs, and the plurality of CPUs may individually implement respective functions of the control unit 105.

The image processing unit 106 applies image processing (so-called development processing) such as gamma correction and white balance processing to the input image in the digital format. Note that the image processing unit 106 executes not only these types of image processing but also image processing using information which is supplied from a subject tracking unit 110 (to be described later) and pertains to a specific subject region in the image.

The image output from the image processing unit 106 is displayed on a display unit 107 such as an LCD or an organic EL display. The image capturing apparatus 100 can cause the display unit 107 to function as an EVF (Electronic ViewFinder) by displaying a moving image captured by the image sensor 102 on the display unit 107 in real time. Also, while functioning as an electronic viewfinder, the display unit 107 can display information indicating the position of a subject region, tracked by the subject tracking unit 110 (to be described later), together with the captured image.

Also, the image output from the image processing unit 106 is recorded in, for example, a detachable memory card by a recording unit 108. The recording destination of the image may be a memory built into the image capturing apparatus 100 or an external device (neither is shown) communicably connected to it via a communication interface. The image processing unit 106 can output an image to be output to the display unit 107 and that to be output to the recording unit 108 by optimizing them for display and recording, respectively. The image processing unit 106 can optimize, for example, the resolution (the number of pixels), the signal format (an RGB format or an YCrCb format), and the data format of an image in accordance with its use application. The image processing unit 106 also executes an image encoding process and decoding process as needed.

A subject specification unit 109 is, for example, an input interface such as a touch panel provided on the display unit 107 or keys and buttons provided on a housing of the image capturing apparatus 100. The user can specify the subject to be tracked by, for example, specifying a desired subject region from the image displayed on the display unit 107. A method of specifying an arbitrary region from the image using, for example, a touch panel or keys and buttons is not particularly limited, and can be a known method. The user can also specify a subject region by selecting a desired subject frame when, for example, the image capturing apparatus 100 has a subject detection function and displays an index such as a frame indicating the detected subject region on the captured image in a superimposed manner.

The subject tracking unit 110 detects the subject image position in the image by template matching between the image output from the image processing unit 106 and the subject image (reference image) specified by the subject specification unit 109. The subject tracking unit 110 implements a subject tracking function by applying this detection process to a plurality of images which are captured at different times and output from the image processing unit 106 in time series.

The subject tracking unit 110 includes a reference image registration unit 111, degree of correlation computation unit 112, and subject extraction unit 113. The reference image registration unit 111 selects partial images of a plurality of images captured at different times from the images supplied by the image processing unit 106, and registers them as reference images. The registered reference images are used by the degree of correlation computation unit 112. Examples of the reference images registered by the reference image registration unit 111 include:

(1) a reference image (first reference image) registered based on a region specified by the subject specification unit 109 at the start of subject tracking, and (2) a reference image (second reference image) which is sequentially updated and registered based on a region extracted by the subject extraction unit 113 during subject tracking.

The degree of correlation computation unit 112 computes the degrees of correlation between a plurality of reference images that are registered by the reference image registration unit 111, and input images that are sequentially supplied by the image processing unit 106 in time series, thereby performing template matching between the input images and the reference images. The degree of correlation is computed by setting a reference region used to compute the degree of correlation in the input image. A region with a highest degree of correlation with the reference image can be presumed in the input image by computing the degrees of correlation with the reference image while sequentially shifting the position of the reference region in the input image. The reference region set in the input image may be the entire input image or its partial region. A maximum degree of correlation in the input image and a region with the maximum degree of correlation can be obtained with respect to each reference image by performing degree of correlation computation with respect to each of the plurality of reference images.

The subject extraction unit 113 determines and extracts one reference region as a subject region based on the degree of correlation with respect to each reference image, which is obtained by the degree of correlation computation unit 112. If, for example, the maximum degree of correlation with a reference image registered at the earliest time by the reference image registration unit 111 is equal to or higher than a predetermined threshold, a reference region with the maximum degree of correlation with that reference image is selected and extracted by the subject extraction unit 113 as a subject region in the input image. On the other hand, if the maximum degree of correlation with that reference image is lower than the predetermined threshold, the subject extraction unit 113 selects and extracts a reference region in which the degree of correlation is highest of the maximum degrees of correlation with the remaining reference images as a subject region in the input image.

The control unit 105 performs AF (Automatic Focus) control and AE (Automatic Exposure) control in the image capturing apparatus 100. More specifically, the control unit 105 controls a focus control mechanism and exposure control mechanism (neither is shown) for the lens unit 101 based on the image output from the A/D conversion unit 104. The focus control mechanism is, for example, an actuator which drives the lens unit 101 in the optical axis direction, and the exposure control mechanism is, for example, an actuator which drives a stop and a shutter (when a mechanical shutter is present).

In determining the image capturing conditions based on the above-mentioned AF control and AE control, the control unit 105 can use the subject region extraction result supplied from the subject tracking unit 110. More specifically, the control unit 105 can perform AF control by controlling the focus detection condition so that the region extracted as a subject region is focused on, and perform AE control by controlling the exposure condition so that the exposure of that region becomes appropriate. The control unit 105 also performs some types of readout control of the image sensor 102, such as control of the output timing of the image sensor 102 and selection control of pixels from which data are read out.

When the image capturing apparatus 100 has a configuration which implements a function of detecting a specific subject, such as a face detection unit, the detected subject region (for example, a face region) can be automatically registered as a reference image. A predetermined region (for example, a focus detection region or a photometric region) in the image, which is to be used for AF control or AE control, respectively, may also be registered in the reference image as an initial subject region. In these cases, the image capturing apparatus 100 need not always include the subject specification unit 109.

(Operation of Subject Tracking Unit 110)

Details of a process of the subject tracking unit 110 will be described next with reference to FIGS. 2 and 3A to 3D. In the following description, assume that a specific subject to be detected and tracked is the face of a person. Assume also that two reference images are registered in the reference image registration unit 111: (1) a reference image (to be referred to as an initial reference image hereinafter) registered based on a region specified by the subject specification unit 109 at the start of subject tracking, and (2) a reference image (to be referred to as an updated reference image hereinafter) which is sequentially updated based on a subject region extracted by the subject extraction unit 113 in accordance with the degree of correlation obtained by the degree of correlation computation unit 112.

In step S201, the reference image registration unit 111 reads images, that are sequentially captured by the image sensor 102, as input images. The reading of input images in step S201 may be done intermittently or for all captured frames.

Figure 3B:
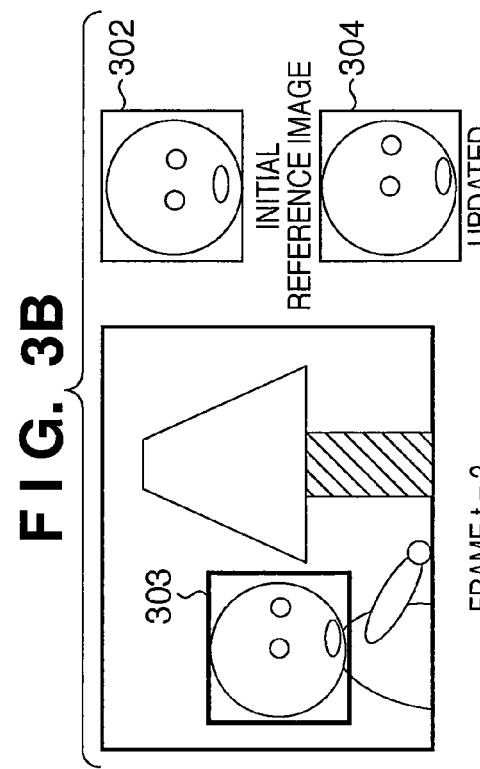
FIGS. 3A to 3D are views for explaining subject tracking according to the first embodiment of the present invention.
Figure 3D:
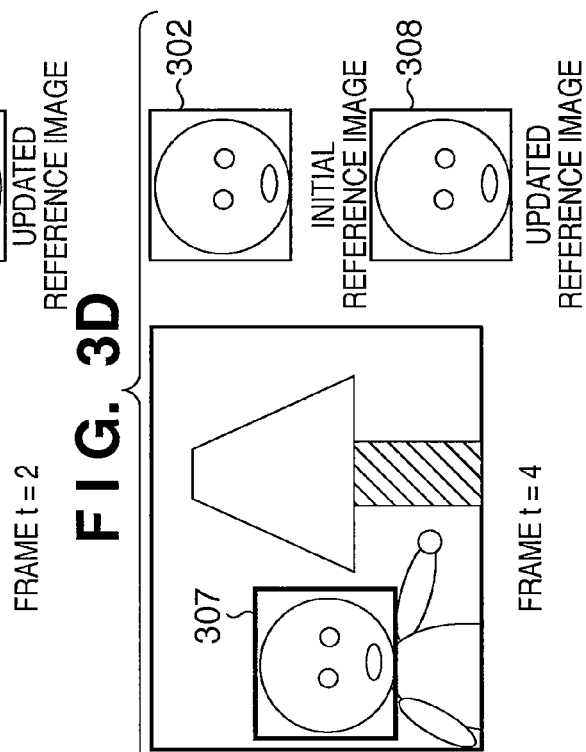
Figure 3A:
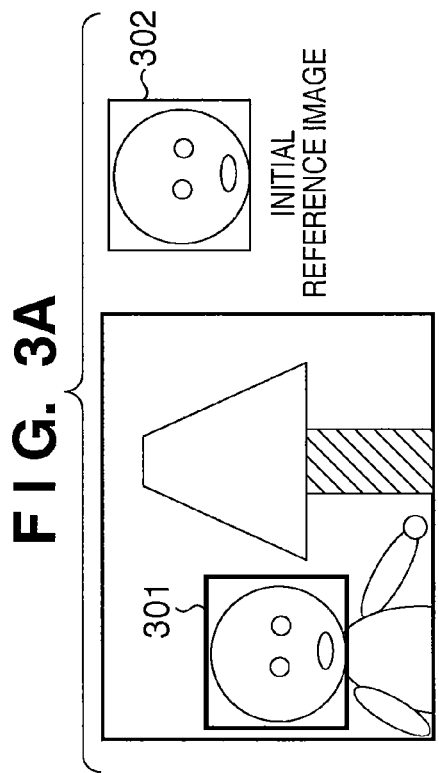

Next, in step S202, the reference image registration unit 111 registers an initial reference image from the input image, based on a partial region specified by the subject specification unit 109. FIG. 3A exemplifies a partial region 301 specified by the subject specification unit 109, and an initial reference image 302. At the start of subject tracking, the partial region 301 specified by the subject specification unit 109 becomes the subject extraction result obtained by the subject extraction unit 113.

When the next input image is read in step S203, the reference image registration unit 111 provides the input image and the initial reference image to the degree of correlation computation unit 112. The degree of correlation computation unit 112 computes the degree of correlation between the input image and the initial reference image (steps S204 to S207 in FIG. 2). First, in step S204, the degree of correlation computation unit 112 sets a partial region with the same size as the initial reference image 302 in the input image as a reference region. In step S205, the degree of correlation computation unit 112 computes the sum of the differences between pixels at positions in the reference region and the initial reference image 302, that correspond to each other. The smaller the computed sum of the differences, the higher the degree of correlation (degree of similarity). In step S206, the degree of correlation computation unit 112 determines whether the degrees of correlation have already been computed for all reference regions upon setting them in the input image. If a region for which the degree of correlation has not yet been computed remains (NO in step S206), in step S204 the degree of correlation computation unit 112 shifts the position of the reference region by a predetermined number of pixels in a predetermined direction, sets it as the next position of the reference region, and repeats subsequent processes.

If the degrees of correlation have already been computed for all reference regions to be set in the input image (YES in step S206), in step S207 a maximum degree of correlation and a region with the maximum degree of correlation are computed. That is, a region in which the sum of the differences between respective pixels in the partial region in the input image and corresponding pixels in the initial reference image 302 is smallest is computed. Note that various kinds of methods of computing the degree of correlation between two images are available, and the process in this embodiment is merely an example of the available methods.

In step S208, the subject extraction unit 113 determines whether an updated reference image has already been registered in the reference image registration unit 111. If an updated reference image has not yet been registered (NO in step S208), in step S211 the subject extraction unit 113 extracts a region with a highest degree of correlation with the initial reference image 302 as a subject region. A subject extraction result 303 shown in FIG. 3B exemplifies the result of this extraction. In step S213, the reference image registration unit 111 registers an updated reference image 304 based on the subject extraction result 303. At this moment, two reference images are registered in the reference image registration unit 111.

The sequence of a process of the subject tracking unit 110 immediately after the start of tracking has been described above. The sequence of a process of the subject tracking unit 110 at subsequent times will be described next.

Figure 2:
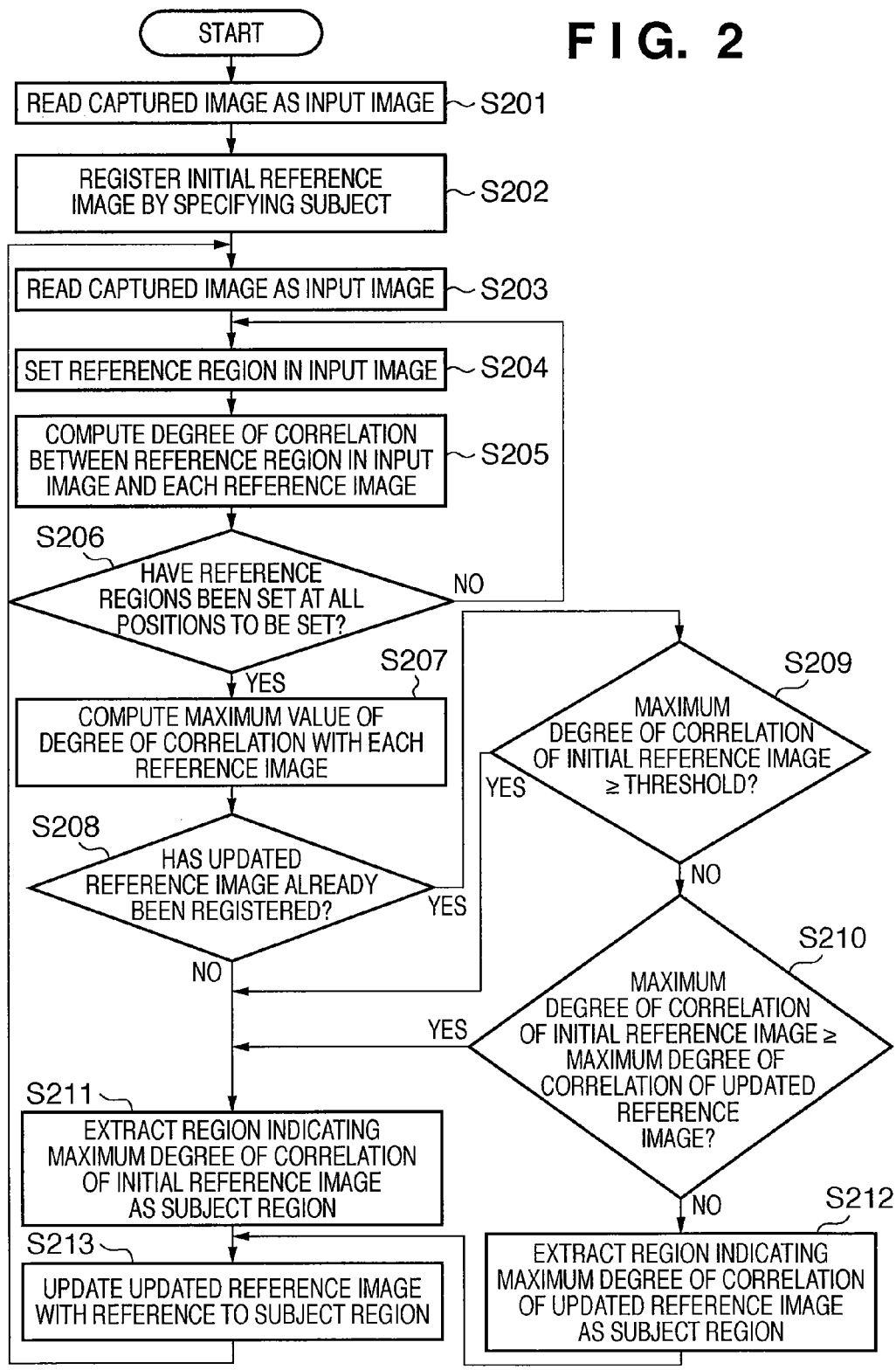
FIG. 2 is a flowchart showing a subject tracking process according to the first embodiment of the present invention.

The degree of correlation computation unit 112 computes not only the degree of correlation between the input image and the initial reference image 302 but also that between the input image and the updated reference image 304, and computes a maximum degree of correlation and a region with the maximum degree of correlation with respect to each reference image (steps S203 to S207 in FIG. 2).

Since an updated reference image has already been registered in the reference image registration unit 111, the subject extraction unit 113 determines in step S209 whether the maximum degree of correlation obtained with respect to the initial reference image 302 is equal to or higher than a predetermined threshold. If the maximum degree of correlation obtained with respect to the initial reference image 302 is equal to or higher than the predetermined threshold (YES in step S209), in step S211 the subject extraction unit 113 extracts a region with a highest degree of correlation with the initial reference image 302 in the input image as a subject region. On the other hand, if the maximum degree of correlation with the initial reference image 302 is lower than the predetermined threshold (NO in step S209), the subject extraction unit 113 determines in step S210 whether the maximum degree of correlation obtained with respect to the initial reference image 302 is equal to or higher than that obtained with respect to the updated reference image 304. If the maximum degree of correlation obtained with respect to the initial reference image 302 is equal to or higher than that obtained with respect to the updated reference image 304 (YES in step S210), the subject extraction unit 113 advances the process to step S211. In step S211, the subject extraction unit 113 extracts a region with a highest degree of correlation with the initial reference image 302 in the input image as a subject region. On the other hand, if the maximum degree of correlation obtained with respect to the initial reference image 302 is lower than that obtained with respect to the updated reference image 304 (NO in step S210), in step S212 the subject extraction unit 113 extracts a region with a highest degree of correlation obtained with respect to the updated reference image 304 in the input image as a subject region.

In step S213, the reference image registration unit 111 updates the updated reference image based on the subject extraction result. By sequentially applying the above-mentioned process to a plurality of input images which are continuously captured by the image sensor 102 and input to the subject tracking unit 110, a specific subject can be tracked for the plurality of input images.

Figure 3C:
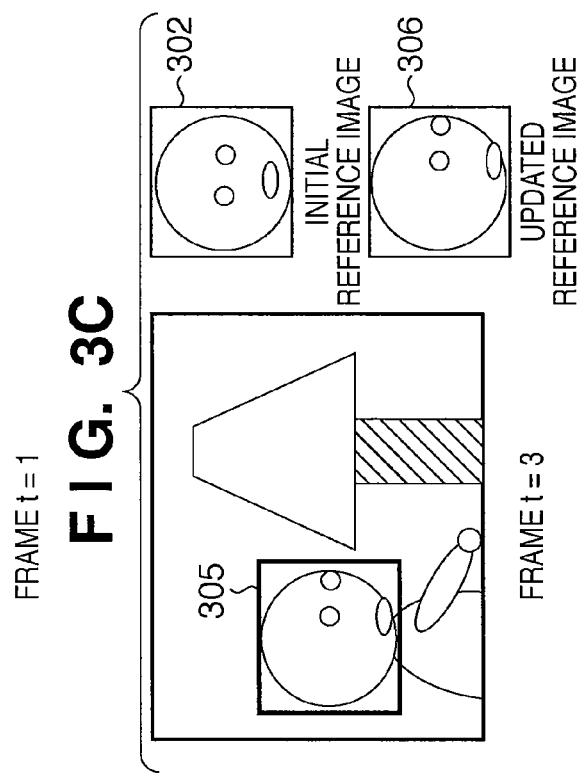
Figure 4:
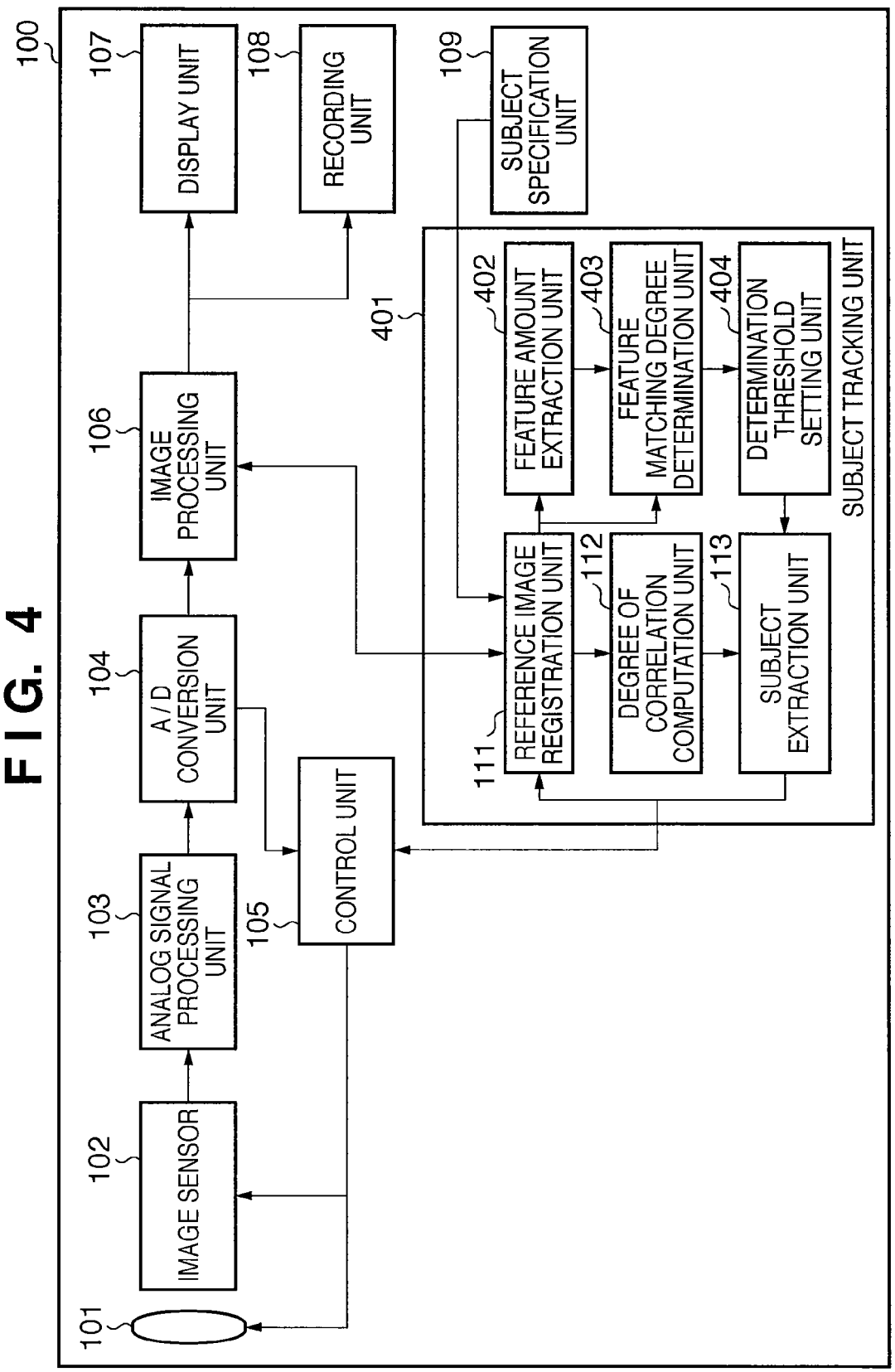
FIG. 4 is a block diagram showing an example of the functional configuration of an image capturing apparatus as an example of a subject tracking apparatus according to the second embodiment of the present invention.

When, for example, the visual aspect of the subject has largely changed from that at the start of tracking, as shown in FIG. 3C, the maximum degree of correlation obtained with respect to the initial reference image 302 is lower than the threshold. Then, the maximum degree of correlation obtained with respect to the updated reference image 304 is equal to or higher than that obtained with respect to the initial reference image 302. In this case, a region 305 with a highest degree of correlation obtained with respect to the updated reference image 304 is extracted as a subject region by the subject extraction unit 113. The extracted subject region 305 is registered in the reference image registration unit 111 as a new updated reference image 306.

When the process continues and the visual aspect of the subject assumes a state similar to that at the start of tracking (FIG. 3D), the maximum degree of correlation obtained with respect to the initial reference image 302 becomes equal to or higher than the threshold, unlike the state shown in FIG. 3C. In this case, a region 307 with a highest degree of correlation obtained with respect to the initial reference image 302 is extracted as a subject region by the subject extraction unit 113. The extracted subject region 307 is registered in the reference image registration unit 111 as a new updated reference image 308.

The reason why the subject extraction unit 113 extracts a subject region in accordance with whether the maximum degree of correlation obtained with respect to the initial reference image is equal to or higher than a predetermined threshold in this embodiment, instead of using the comparison result between the maximum degree of correlation obtained with respect to the initial reference image and that obtained with respect to the updated reference image, will be explained herein.

The difference in image capturing time between the initial reference image and the input image increases after the start of tracking, so the maximum degree of correlation generally is more likely to have a smaller value with time as compared to the maximum degree of correlation at the start of tracking. In contrast, the updated reference image is updated as needed, so the difference in image capturing time between the updated reference image and the input image is kept at a nearly constant, small value, and the maximum degree of correlation is more likely to be computed as a relatively high value. Upon a simple comparison between the maximum degree of correlation obtained with respect to the initial reference image and that obtained with respect to the updated reference image, the latter is more likely to get higher than the former as the time elapses more after the start of tracking.

This tendency is independent of whether the updated reference image correctly coincides with the subject region. When the subject extraction region includes a region different from the subject because, for example, the subject is partially hidden behind a shield, the updated reference image, in turn, includes a region different from the subject as well. However, even such an updated reference image has a small difference in image capturing time from the input image, so the maximum degree of correlation obtained with respect to this updated reference image is more likely to get higher. Therefore, when a region corresponding to a reference image with a high maximum degree of correlation is simply extracted as a subject region, a region in which the subject is absent is continuously tracked.

In contrast, the initial reference image is based on a region specified as that of the subject by the user or a subject region detected by a subject detection function, so a region with a high degree of correlation is expected to be the subject region at a high probability. To appropriately execute subject tracking in consideration of such a difference in characteristic between the reference images, the subject extraction unit 113 decides whether to extract a subject region based on the initial reference image or the updated reference image, in accordance with whether the maximum degree of correlation with the initial reference image is equal to or higher than a predetermined threshold.

In this embodiment, two reference images: an initial reference image and an updated reference image are registered in the reference image registration unit 111. However, a plurality of reference images based on subject regions extracted from images input to the subject tracking unit 110 at different times may be registered, and a first reference image based on a first input image and a second reference image based on a second input image input later than the first input image may be used. Also, although the initial reference image is registered at the start of subject tracking in the foregoing description, it may be registered a predetermined time after the start of subject tracking or registered after a region specified by the subject specification unit 109 is focused on. Moreover, although the updated reference image is sequentially updated based on the subject extraction result in the foregoing description, a condition in which it is updated only if the degree of correlation is equal to or higher than a threshold, for example, may be set. An average image between the subject extraction result and an updated reference image closest to it in time may be generated and registered as a new updated reference image.

As described above, according to this embodiment, a plurality of reference images based on subject regions extracted from images input at different times, such as an initial reference image corresponding to a subject region specified at the start of tracking and an updated reference image sequentially updated based on the subject extraction result, are registered. The degrees of correlation of the input image are obtained with respect to the plurality of reference images. If the maximum degree of correlation obtained with respect to a reference image based on an old input image is lower than a threshold, a subject region is extracted based on a reference image based on a new input image, and the reference image based on the new input image is updated using the extracted subject region. This makes it possible to improve the trackability for a change in visual aspect of the subject due to the use of the updated reference image to be sequentially updated, and prevent erroneous tracking due to updating of the updated reference image using erroneous contents. Also, when a subject region is extracted based on an old input image, the contents of a reference image based on a new input image axe replaced with an image with a high degree of correlation with a reference image based on the old input image. Thus, even if the reference image based on the new input image includes a region different from the subject in the process of updating, it can be automatically restored to appropriate contents. In this manner, stable subject tracking is possible even if the visual aspect of the subject changes.

Second Embodiment

An image capturing apparatus as an example of a subject tracking apparatus according to the second embodiment of the present invention will be described next with reference to FIGS. 4 to 6C by focusing attention mainly on differences from the first embodiment. Note that the same reference numerals as in FIGS. 1 to 3D according to the first embodiment denote the same configurations and operations in FIGS. 4 to 6C, and a repetitive description thereof will not be given.

An image capturing apparatus 400 according to this embodiment is different from the image capturing apparatus 100 in the first embodiment in that a subject tracking unit 401 has a configuration different from the subject tracking unit 110. More specifically, the image capturing apparatus 400 is different from the image capturing apparatus 100 in the first embodiment in that in the former a feature amount extraction unit 402, a feature matching degree determination unit 403, and a determination threshold setting unit 404 are added as constituent elements of the subject tracking unit 401.

The feature amount extraction unit 402 extracts feature amounts from a reference image registered in a reference image registration unit 111. The reference image from which feature amounts are extracted is based on, for example, an initial reference image registered based on a region specified by a subject specification unit 109 at the start of subject tracking, that is, a reference image based on an oldest captured image (oldest input image) among registered reference images. The feature amount extraction unit 402, for example, generates histograms of the values of predetermined components of pixels included in a predetermined region in the reference image, and extracts a value with a frequency equal to or higher than a predetermined threshold as a feature amount. The pixel components for which histograms are generated are, for example, the same as those used to compute the degree of correlation by a degree of correlation computation unit 112. Detailed examples of the pixel components include a hue (H) in an HSV image represented by HSV representation which uses a hue (H), a saturation (S), and a value of brightness (V). Note that various kinds of feature amount extraction methods are available, and the process in this embodiment is merely an example.

The feature matching degree determination unit 403 sets images that are sequentially captured by an image sensor 102 as input images, and determines the degrees of matching of the input images with the feature amounts extracted by the feature amount extraction unit 402. The degree of matching with the feature amounts means the ratio of the number of pixels determined to match the feature amounts extracted by the feature amount extraction unit 402 to the total number of pixels in the input image. Note that various kinds of methods of determining the degree of matching with the feature amounts are available, and the process in this embodiment is merely an example.

The determination threshold setting unit 404 changes a threshold in a process of determining a subject region by a subject extraction unit 113 and, more specifically, a threshold in a determination process in step S209 of the first embodiment, in accordance with the degree of matching with the feature amounts, which is obtained by the feature matching degree determination unit 403. This threshold is used for a comparison with a maximum degree of correlation obtained with respect to a reference image (for example, an initial reference image) based on an oldest input image among a plurality of reference images registered in the reference image registration unit 111. The determination threshold setting unit 404 sets the threshold larger as the degree of matching of the input image with the feature amounts gets higher, and smaller as this degree gets lower. As the threshold becomes larger, NO is more likely to be determined in step S209, and a subject region is more likely to be extracted based on an updated reference image. On the other hand, as the threshold becomes smaller, a subject region is more likely to be extracted based on an initial reference image. This is because as the degree of matching of the input image with the feature amounts gets lower, the number of regions with the same feature as the initial reference gets smaller, and the possibility that a region with a high degree of correlation with the initial reference image is the subject region increases. Conversely, as the degree of matching of the input image with the feature amounts gets higher, the number of regions with the same feature as the initial reference image gets larger, and the possibility that a region with a high degree of correlation is the subject region decreases.

In this manner, this embodiment is characterized in that "the probability that a region in an input image, which has a highest degree of correlation with a reference image based on an oldest input image among a plurality of reference images registered in the reference image registration unit 111, is extracted as a subject region" is dynamically adjusted to be lower as "the degree of matching between the input image and the feature amounts of the reference image based on the oldest input image," gets higher and to be higher as this degree of matching gets lower.

(Operation of Subject Tracking Unit 401)

Figure 6A:
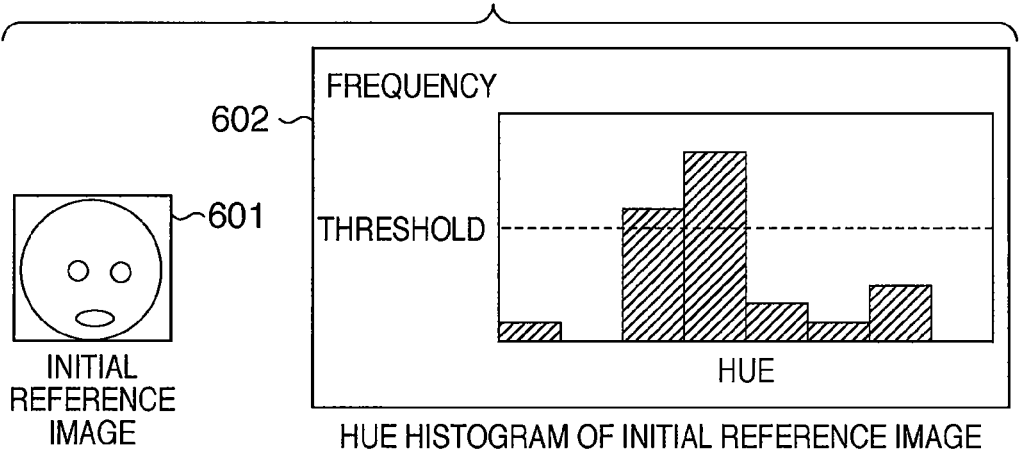
FIGS. 6A to 6C are views for explaining subject tracking according to the second embodiment of the present invention.
Figure 6B:
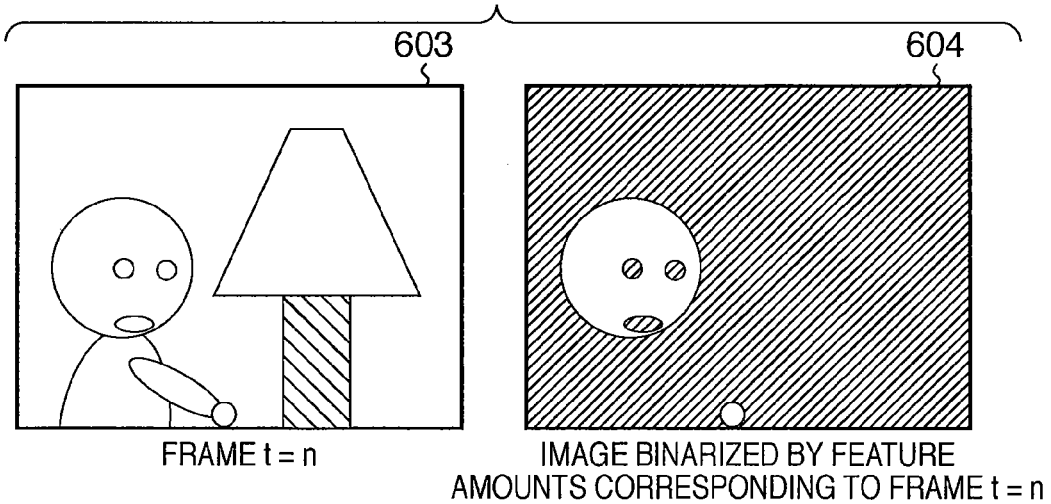
Figure 6C:
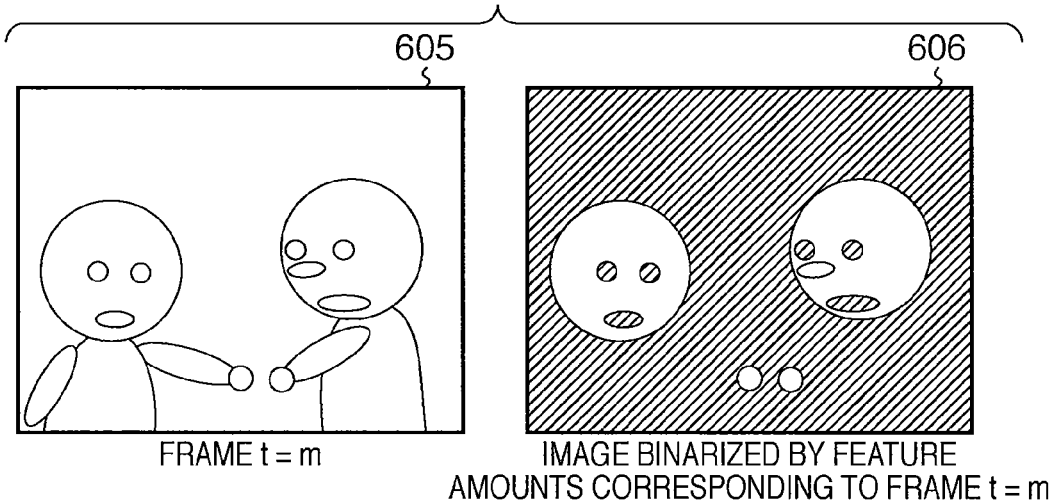

Details of a process of the subject tracking unit 401 will be described next with reference to FIGS. 5 and 6A to 6C by focusing attention mainly on differences from the first embodiment. In the following description, FIG. 5 is a flowchart showing a subject tracking process according to the second embodiment, as in the first embodiment. FIGS. 6A to 6C are views for explaining subject tracking. In the following description, assume that a specific subject to be detected and tracked is the face of a person, as in the first embodiment. Assume also that two reference images: an initial reference image and an updated reference image are registered in the reference image registration unit 111.

Note that the same reference numerals as in FIG. 2 denote the same processes in FIG. 5, and a repetitive description thereof will not be given. Note also that step S505 collectively indicates processes in steps S204 to S207 in FIG. 2, and step S508 collectively indicates processes in steps S208 to S212 in FIG. 2.

In processes of steps S201 and S202, the subject tracking unit 401 registers an initial reference image from the input image, based on a partial region specified by the subject specification unit 109. FIG. 6A exemplifies an initial reference image 601. In step S503, the feature amount extraction unit 402 extracts a predetermined region in the initial reference image, that is, predetermined feature amounts from the entire input image in this case. In this case, as the feature amount, the value of the hue (H) of a pixel when the initial reference image is represented by an HSV color space is adopted. The feature amount extraction unit 402 generates a hue histogram 602 for each pixel in the initial reference image 601, as shown in FIG. 6A. The feature amount extraction unit 402 extracts the range of hue value indicating a frequency equal to or higher than a predetermined threshold as feature amounts in the hue histogram 602. The extracted feature amounts are held for a period of time in which subject tracking continues, like the initial reference image. In this case, the feature amount extraction unit 402 holds the feature amounts.

When the next input image is read in step S203, the degree of correlation computation unit 112 computes the degree of correlation of the input image (an image to be searched) with respect to each reference image for each reference region in the same way as in steps S204 to S207 of FIG. 2. Note that during the period in which no updated reference image is registered, the degree of correlation computation unit 112 computes only the degree of correlation between the input image and the initial reference image.

In step S506, the feature matching degree determination unit 403 counts the number of pixels, which match the feature amounts of the initial reference image held in the feature amount extraction unit 402 (in which the hue value is included in the range of feature amount), among pixels included in the input image, and computes the ratio of the number of them to the total number of pixels. For example, the feature matching degree determination unit 403 generates, from the input image, a binary image having white pixels which match the feature amounts and black pixels which do not match these feature amounts, and computes the ratio of the number of white pixels to the total number of pixels as the degree of matching of the input image with the feature amounts. FIG. 6B exemplifies an input image 603 at a time n, and an image 604 obtained by binarizing the input image 603 using the feature amounts obtained from the hue histogram 602 shown in FIG. 6A. Also, FIG. 6C exemplifies an input image 605 at a time m (m>n), and an image 606 obtained by binarizing the input image 605 using the feature amounts obtained from the hue histogram 602 shown in FIG. 6A.

In step S507, the determination threshold setting unit 404 sets a threshold with which the subject extraction unit 113 determines in step S209 of FIG. 2 whether a region indicating a maximum degree of correlation obtained with respect to the initial reference image is to be set as a subject region, in accordance with the degree of matching of the input image with the feature amounts. If the degree of matching of the input image with the feature amounts is low, as in the input image 603 shown in FIG. 6B, the determination threshold setting unit 404 sets the threshold small so that a subject region is more likely to be extracted based on the degree of correlation with the initial reference image. This is because the subject could be separated from a region other than the subject by the feature amounts of the initial reference image, and the reliability that a region indicating a maximum degree of correlation with the initial reference image is the region to be tracked is therefore high. On the other hand, if the degree of matching with the feature amounts is high, as in the input image 605 shown in FIG. 6C, the determination threshold setting unit 404 sets the threshold large so that a subject region is less likely to be extracted based on the degree of correlation with the initial reference image. This is because the subject could not be separated from a region other than the subject by the feature amounts of the initial reference image, and the reliability that a region indicating a maximum degree of correlation with the initial reference image is a region different from that to be tracked is therefore high.

In step S508, the subject extraction unit 113 extracts a subject region in the same way as in steps S208 to S212 of FIG. 2. In step S213, the reference image registration unit 111 registers (updates) an updated reference image based on the subject extraction result obtained in step S508.

By sequentially applying the above-mentioned process to a plurality of input images which are continuously captured by the image sensor 102 and input to the subject tracking unit 110, a specific subject can be tracked for the plurality of input images.

In this manner, according to this embodiment, the degree of matching of the input image with the feature amounts of a reference image based on an oldest input image among a plurality of reference images is obtained. If the degree of matching is relatively high, a subject region is made less likely to be extracted based on the degree of correlation with the reference image based on the oldest input image. On the other hand, if the degree of matching is relatively low, a subject region is made more likely to be extracted based on the degree of correlation with the reference image based on the oldest input image. This makes it possible not only to obtain the effect of the first embodiment but also to improve the subject tracking accuracy.

Third Embodiment

<Configuration and Operation of Image Capturing Apparatus>

FIG. 7 is a block diagram showing an example of the functional configuration of an image capturing apparatus 700 as an example of a subject tracking apparatus according to the third embodiment of the present invention. The same reference numerals as in FIG. 1 denote the same functional blocks in FIG. 7, and a repetitive description thereof will not be given.

A subject region extraction unit 710 extracts a target subject region from a region specified by a subject specification unit 109 in the image supplied from an image processing unit 106. The subject region extraction unit 710 includes a feature amount extraction unit 711, misalignment detection unit 712, and region correction unit 713 (all will be described later).

The feature amount extraction unit 711 extracts feature amounts indicating the feature of the target subject from a predetermined region in the region specified by the subject specification unit 109 in the image supplied from the image processing unit 106. Details of the feature amount extraction unit 711 will be described later.

The misalignment detection unit 712 detects the amount and direction of a misalignment of the target subject region in the region specified by the subject specification unit 109 in the image supplied from the image processing unit 106, based on the distribution of feature pixels which match the feature amounts extracted by the feature amount extraction unit 711 within the specified region. Details of the misalignment detection unit 712 will be described later.

The region correction unit 713 corrects the position of the region specified by the subject specification unit 109, in accordance with the amount and direction of misalignment detected by the misalignment detection unit 712. The subject region extraction unit 710 extracts an image in the specified region, the position of which is corrected, as a subject region.

<Configuration and Operation of Feature Amount Extraction Unit 711>

Figure 8A:
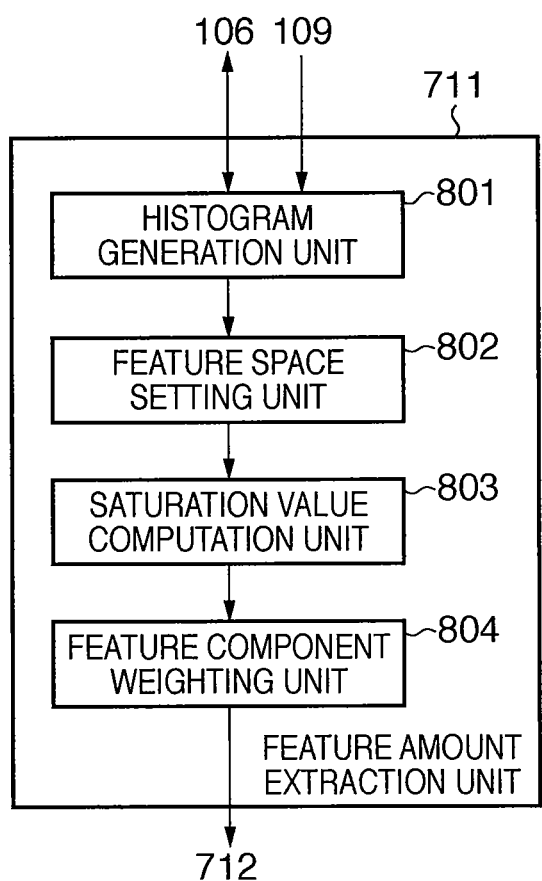
FIGS. 8A and 8B are block diagrams showing examples of the configurations of a feature amount extraction unit and misalignment detection unit, respectively, shown in FIG. 7.

An example of the configuration and operation of the feature amount extraction unit 711 shown in FIG. 7 will be explained herein with reference to FIG. 8A. The feature amount extraction unit 711 includes a histogram generation unit 801, feature space setting unit 802, saturation value computation unit 803, and feature component weighting unit 804.

The feature amount extraction unit 711 extracts feature amounts indicating the feature of the target subject from the region (to be referred to as the specified region hereinafter) specified by the subject specification unit 109 in the image supplied from the image processing unit 106. Although the image supplied from the image processing unit 106 is represented by an HSV color space including a hue (H), a saturation (S), and a value of brightness (V), the present invention is not limited to this, and this image may be represented by, for example, an HLS color space including a hue (H), a saturation (S), and a lightness or a luminance (L). First, the histogram generation unit 801 generates histograms of hue components and brightness components from each pixel within the specified region.

The feature space setting unit 802 sets a feature space from the histograms of hue components and brightness components, which are generated by the histogram generation unit 801. Note that in the histogram of each of hue components and brightness components, a value with a maximum frequency is set as a feature space. Alternatively, a space indicated by hue components and brightness components with frequencies equal to or more than a predetermined threshold may be set as a feature space. Or again, a space indicated by hue components and brightness components in each of which the ratio of the number of pixels present within the specified region in the image supplied from the image processing unit 106 to that of pixels present in a region other than the specified region in this image is equal to or higher than a predetermined threshold may be set as a feature space. In other words, a color space indicated by hue components and brightness components which are intensely distributed within the specified region may be set as a feature space.

The saturation value computation unit 803 determines a pixel belonging to the feature space of hue components, set by the feature space setting unit 802, for each pixel within the specified region, and computes the average as a representative value of the saturations of the group of these pixels. The representative value of the saturations of pixels belonging to the feature space of hue components may be a value, obtained by another computation method, such as the median in place of the average.

The feature component weighting unit 804 weights the hue components and brightness components that are set as a feature space by the feature space setting unit 802. More specifically, the feature component weighting unit 804 compares the threshold and the average of the saturations computed by the saturation value computation unit 803, and weights the feature space of hue components if the average of the saturations is equal to or larger than the threshold, or the feature space of brightness components if this average is smaller than the threshold, thereby detecting a misalignment. The feature component weighting unit 804 outputs the weighted feature spaces of hue components and/or brightness components to the misalignment detection unit 712 as the feature amounts of the subject. This weighting will be described in more detail later.

<Configuration and Operation of Misalignment Detection Unit>

Figure 8B:
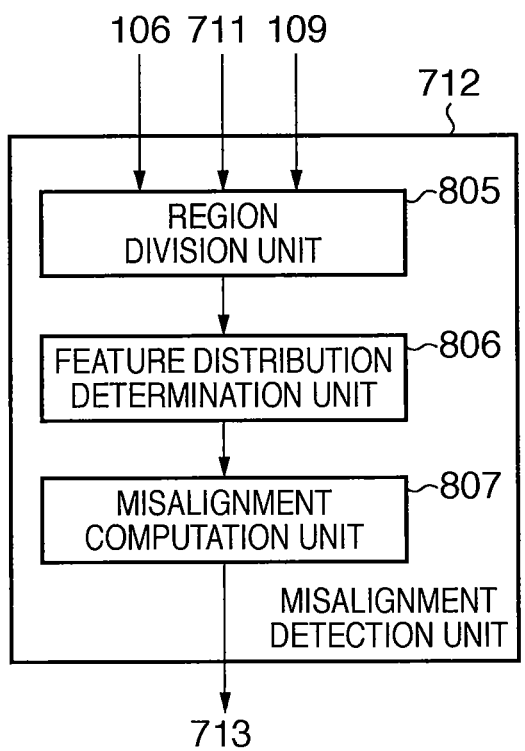

An example of the configuration of the misalignment detection unit 712 shown in FIG. 7 will be explained next with reference to FIG. 8B. The misalignment detection unit 712 includes a region division unit 805, feature distribution determination unit 806, and misalignment computation unit 807.

The misalignment detection unit 712 detects a misalignment of the position of the target subject region within the specified region, based on the distribution of pixels which match the feature amounts extracted by the feature amount extraction unit 711 (pixels which have specific hue and/or brightness components extracted as feature amounts, and will be referred to as feature pixels hereinafter). The region division unit 805 divides the specified region by axes of symmetry, which divide it into halves in the vertical and horizontal directions, respectively. The feature distribution determination unit 806 determines a pixel belonging to the feature amount extracted by the feature amount extraction unit 711 as a feature pixel for each pixel within the specified region. The feature distribution determination unit 806 computes the number of feature pixels in each region divided by the region division unit 805.

The misalignment computation unit 807 computes the amount and direction of misalignment of the target subject region within the specified region, in accordance with the number of feature pixels in each divided region. The direction of misalignment is a direction which is perpendicular to each axis of symmetry and which points in a region, with a larger number of feature pixels, of the two divided regions. Also, the correction amount is a value which corresponds to the difference in number of feature pixels between the two divided regions so that the misalignment of the distribution of feature pixels about each axis of symmetry as its center reduces upon correcting the position of the specified region. That is, the horizontal correction amount is decided in accordance with the difference in number of feature pixels between the two regions divided by the vertical axis, and the vertical correction amount is decided in accordance with the difference in number of feature pixels between the two regions divided by the horizontal axis. Although an example in which a subject region is divided into two regions in the horizontal and vertical directions has been given in this embodiment, the subject region may be divided in any manner as long as it can be divided into a plurality of symmetrical regions to make it possible to detect a misalignment of the distribution of feature pixels within it.

The image capturing apparatus 700 including the subject region extraction unit 710 which extracts a target subject region based on the region specified by the subject specification unit 109 has been exemplified in this embodiment. However, the subject specification unit 109 of the image capturing apparatus 700 may have a configuration which specifies a target subject region in accordance with a predetermined region (for example, an AF frame or a photometric frame) in an image, which is to be used for a focus control mechanism or an exposure control mechanism, in place of an input interface.

<Subject Region Extraction Process>

Figure 9:
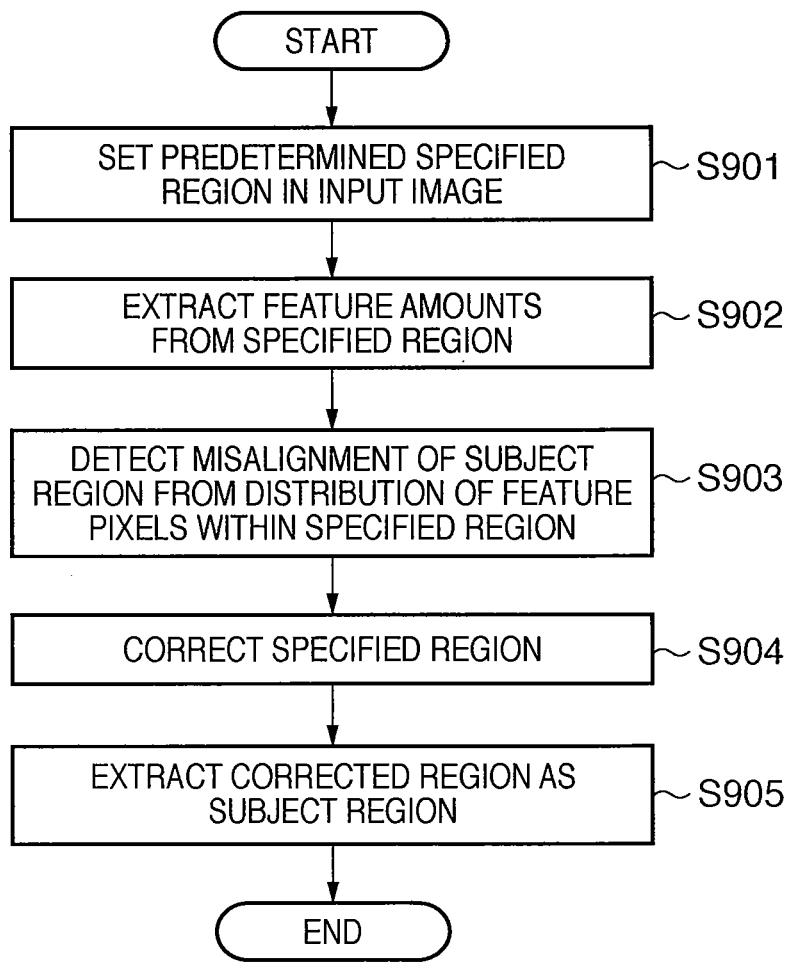
FIG. 9 is a flowchart showing a subject region extraction process in the third embodiment of the present invention.
Figure 10:
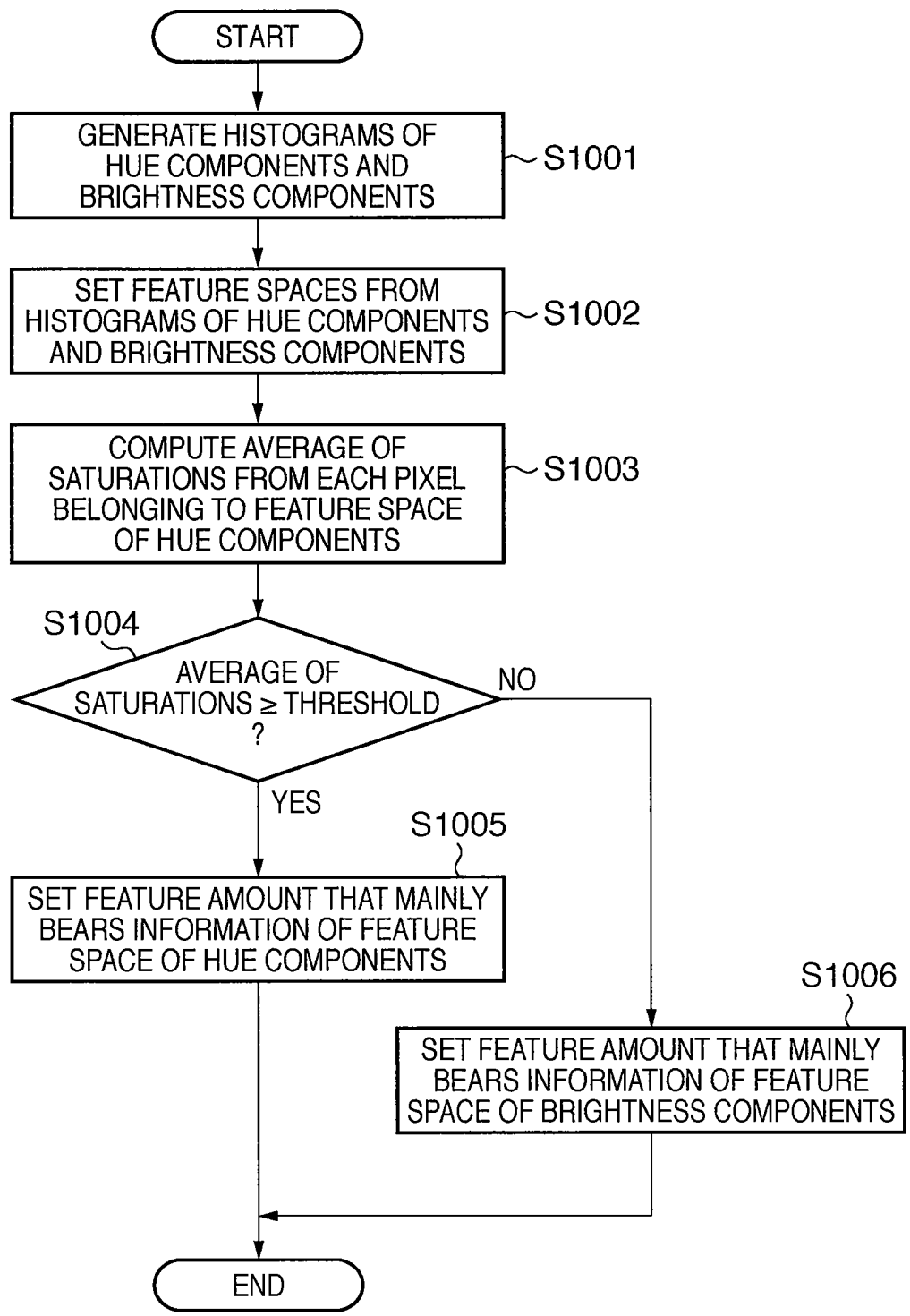
FIG. 10 is a flowchart showing a feature amount extraction process in the third embodiment of the present invention.
Figure 11:
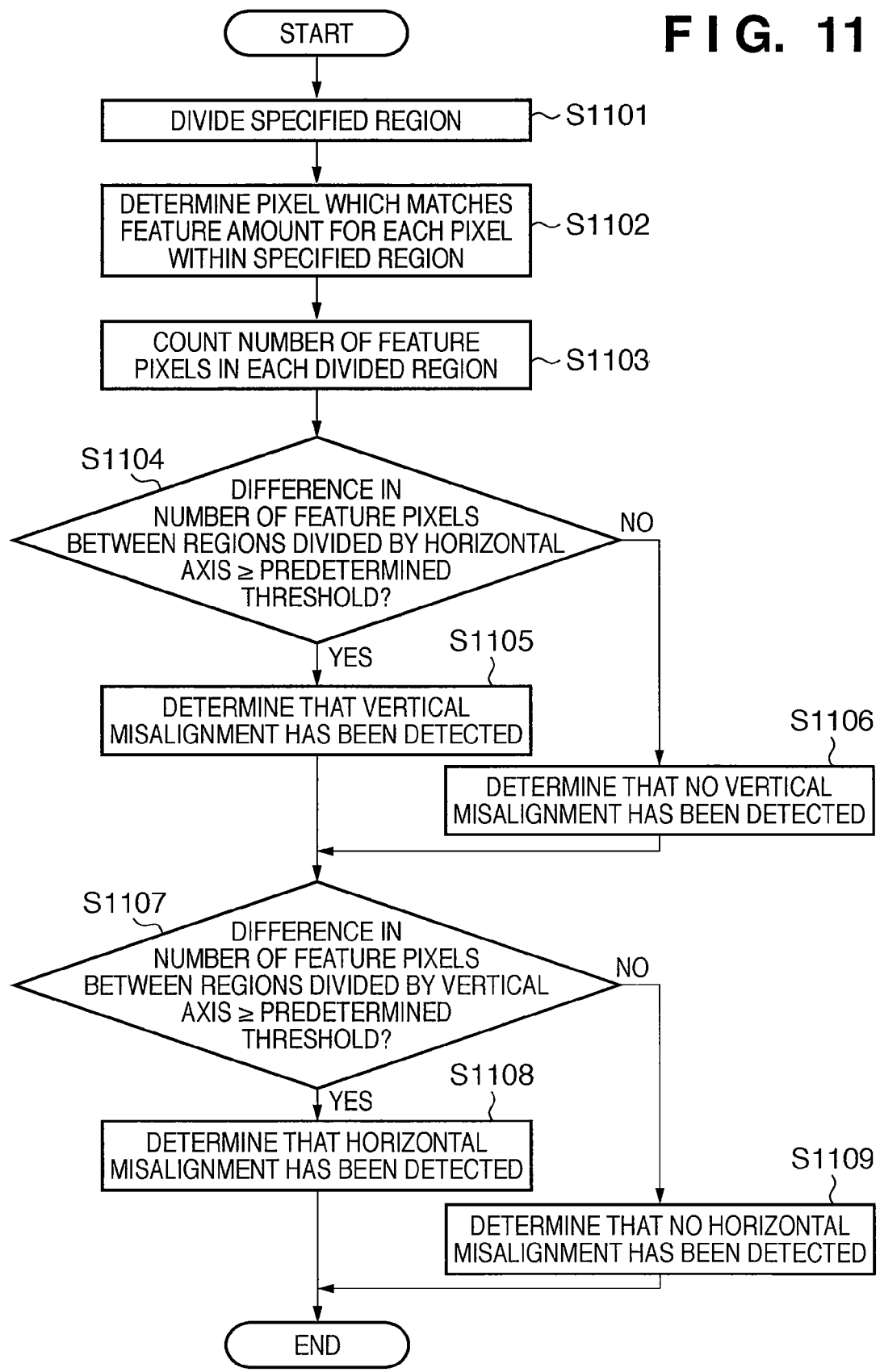
FIG. 11 is a flowchart showing a misalignment detection process in the third embodiment of the present invention.

A subject region extraction process executed by the subject region extraction unit 710 in this embodiment will be described herein with reference to FIGS. 9 to 12D. The subject region extraction unit 710 performs processes in steps S901 to S905, as shown in FIG. 9. Step S902 is a process by the feature amount extraction unit 711, step S903 is a process by the misalignment detection unit 712, and step S904 is a process by the region correction unit 713. Also, the feature amount extraction unit 711 performs processes in step S1001 to S1006, as shown in FIG. 10. Step S1001 is a process by the histogram generation unit 801, step S1002 is a process by the feature space setting unit 802, step S1003 is a process by the saturation value computation unit 803, and steps S1004 to S1006 are processes by the feature component weighting unit 804. Moreover, the misalignment detection unit 712 performs processes in steps S1101 to S1109, as shown in FIG. 11. Step S1101 is a process by the region division unit 805, steps S1102 and S1103 are processes by the feature distribution determination unit 806, and step S1104 to S1109 are processes by the misalignment computation unit 807.

Referring to FIGS. 12A to 12D, in an input image 1201, a region surrounded by a rectangle indicated by a dotted line corresponds to the region specified by the subject specification unit 109. An image 1202 is a binary image in which pixels with the feature amounts extracted by the feature amount extraction unit 711 are represented by white and those without these feature amounts are represented by black. An image 1203 is obtained by dividing the specified region in the horizontal and vertical directions. An image 1204 is a subject extraction result image obtained by correcting the position of the specified region by the region correction unit 713 and extracting the corrected, specified region as a subject region.

Figure 12A:
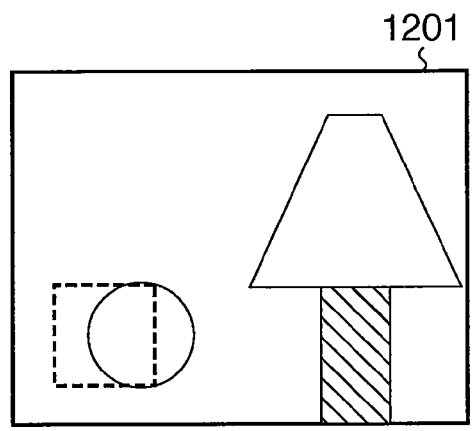
FIGS. 12A to 12D are views for explaining a subject region extraction process in the third embodiment of the present invention.
Figure 12B:
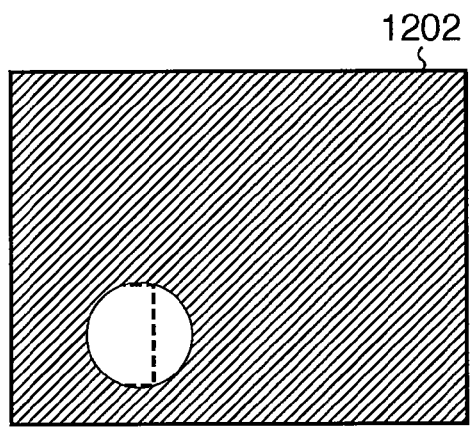

In step S901 of FIG. 9, the subject region extraction unit 710 reads images, that are sequentially captured by the image sensor 102, as input images, and sets a region specified by the subject specification unit 109 in the input image 1201 as, for example, a rectangle which is indicated by a dotted line and shown in the input image 1201 of FIG. 12A. Next, in step S902, the feature amount extraction unit 711 extracts feature amounts indicating the target subject from pixels within the region specified in step S901.

A feature amount extraction process will be described herein with reference to FIG. 10. First, in step S1001 of FIG. 10, the histogram generation unit 801 of the feature amount extraction unit 711 generates histograms of hue components and brightness components from each pixel within the specified region. Next, in step S1002, the feature space setting unit 802 of the feature amount extraction unit 711 sets the values of hue components and brightness components with maximum frequencies in the histograms as the feature spaces of respective components. In step S1003, the saturation value computation unit 803 of the feature amount extraction unit 711 determines a pixel belonging to the feature space of hue components for each pixel within the specified region, and computes the average of the saturations of the pixels determined to belong to this space.

In step S1004, the feature component weighting unit 804 of the feature amount extraction unit 711 determines whether the computed average of the saturations is equal to or larger than a predetermined value. If the average of the saturations is equal to or larger than the predetermined threshold (YES in step S1004), the subject has a chromatic color, so the feature component weighting unit 804 sets a feature amount that mainly bears the information of the feature space of hue components in step S1005. On the other hand, if the average of the saturations is smaller than the predetermined threshold (NO in step S1004), the subject has an achromatic color, so the feature component weighting unit 804 sets a feature amount that mainly bears the information of the feature space of brightness components in step S1006.

A feature component weighting process (steps S1004 to S1006) by the feature component weighting unit 804 will be described herein. Considering that a feature amount with which the target subject region and other regions such as the background can be separated from each other is desirable, hue components are excellent in terms of separating the subject region and other regions because they are less subject to illumination fluctuations. Nevertheless, if the target subject has an achromatic color (has a small saturation value), it is often difficult for hue components to separate the subject region and other regions. In contrast, brightness components are subject to illumination fluctuations and therefore have an accuracy of separating the subject region and other regions, that is lower than hue components if the target subject has a chromatic color (has a large saturation value). Based on the characteristics of these two types of components, the feature component weighting unit 804 weights feature components in accordance with the average of the saturations to obtain final feature amounts.

The weighting can be performed such that, for example, only the feature space of hue components is set as a feature amount if the average of the saturations is equal to or larger than a predetermined threshold, and only the feature space of brightness components is set as a feature amount if the average of the saturations is smaller than the predetermined threshold. The weighting can also be performed such that a narrow range is set for the feature space of hue components and a wide range is set for the feature space of brightness components if the average of the saturations is equal to or larger than a predetermined threshold, thereby setting the feature spaces of hue components and brightness components as feature amounts. In this case, a pixel belonging to both the feature spaces which form feature amounts is set as a feature pixel. Note that for the "wide range", a relatively wide value range assuming the value of a maximum frequency as its center is set as a feature amount, and for the "narrow range", a relatively narrow value range (for example, only the value of a maximum frequency) assuming the value of a maximum frequency as its center is set as a feature amount. This is based on the characteristics in which hue variance is small and brightness variance is large in the subject region when the target subject has a chromatic color (has a large saturation value). On the other hand, if the average of the saturations is smaller than the predetermined threshold, a wide range can be set for the feature space of hue components, and a narrow range can be set for the feature space of brightness components, thereby setting a pixel belonging to both the feature spaces of hue components and brightness components as a feature pixel. This is based on the characteristics in which hue variance is large in the subject region when the target subject has an achromatic color (has a small saturation value).

The above-mentioned weighting by the feature component weighting unit 804 is merely an example, and the present invention is not limited to this. For example, the ratio at which a plurality of types of feature components are weighted may be changed in accordance with color information other than a hue and a brightness, such as a luminance or a color difference obtained from the subject region, in place of or in addition to a saturation. Also, although a process of extracting a feature amount using at least one of the feature spaces of brightness components and hue components has been exemplified in this embodiment, the feature amount extraction method is not limited to the above-mentioned process. For example, to improve the separation performance between the subject and other regions in the feature space, maximum and minimum values may be set for the saturation to narrow down the range of feature space. Also, in the use of both the feature spaces of hue components and brightness components, their weighting ratio may be changed in accordance with whether the average of the saturations is equal to or larger than a predetermined threshold. For example, if the average of the saturations is equal to or larger than the predetermined threshold, a misalignment of the position of the subject region can be detected in step S903 (to be described later) upon weighting pixels included in the feature space of hue components and those included in the feature space of brightness components at 2:1. Conversely, if the average of the saturations is smaller than the predetermined threshold, a misalignment of the position of the subject region can be detected in step S903 (to be described later) upon weighting pixels included in the feature space of hue components and those included in the feature space of brightness components at 1:2. Alternatively, the weighting ratio between pixels included in the feature space of hue components and those included in the feature space of brightness components may be continuously changed.

Figure 12C:
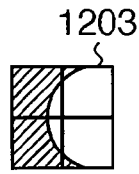

Referring back to FIG. 9, in step S903, the misalignment detection unit 712 determines a pixel having the feature amount extracted in step S902 as a feature pixel, and detects a misalignment of the position of the target subject region within the specified region from the distribution of feature pixels. A misalignment detection process will be described herein with reference to FIG. 11. First, in step S1101 of FIG. 11, the region division unit 805 sets vertical and horizontal axes to divide the specified region into quarters, as shown in the image 1203 of FIG. 12C. Next, in step S1102, the feature distribution determination unit 806 determines a feature pixel having the extracted feature amount for each pixel within the specified region. The binary image 1202 shown in FIG. 12B and the specified region division image 1203 shown in FIG. 12C are obtained by representing feature pixels using white and non-feature pixels using black (note that frames and axes are not images).

In step S1103, the misalignment computation unit 807 computes the number of feature pixels in each divided region. In step S1104, the misalignment computation unit 807 determines whether the difference in number of feature pixels between the regions divided by the horizontal axis (the difference between the number of feature pixels included in the two upper divided regions in the specified region division image 1203 and that of feature pixels included in the two lower divided regions in this image) is equal to or larger than a predetermined threshold. If that difference is equal to or larger than the threshold (YES in step S1104), the misalignment computation unit 807 detects in step S1105 that a vertical misalignment is present. On the other hand, if that difference is smaller than the threshold (NO in step S1104), the misalignment computation unit 807 determines that no vertical misalignment is present (S1106). In case of the specified region division image 1203 shown in FIG. 12C, the misalignment computation unit 807 determines that no vertical misalignment is present.

In step S1107, the misalignment computation unit 807 determines whether the difference in number of feature pixels between the regions divided by the vertical axis (the difference between the number of feature pixels included in the two left divided regions in the specified region division image 1203 and that of feature pixels included in the two right divided regions in this image) is equal to or larger than a predetermined threshold. If that difference is equal to or larger than the threshold (YES in step S1107), the misalignment computation unit 807 detects in step S1108 that a horizontal misalignment is present. On the other hand, if that difference is smaller than the threshold (NO in step S1107), the misalignment computation unit 807 determines that no horizontal misalignment is present (S1109). In case of the specified region division image 1203 shown in FIG. 12C, the misalignment computation unit 807 detects that a horizontal misalignment is present. Note that the misalignment computation unit 807 determines the correction amount based on the amount of difference in number of feature pixels in the direction in which the subject region is detected to have a misalignment.

Figure 12D:
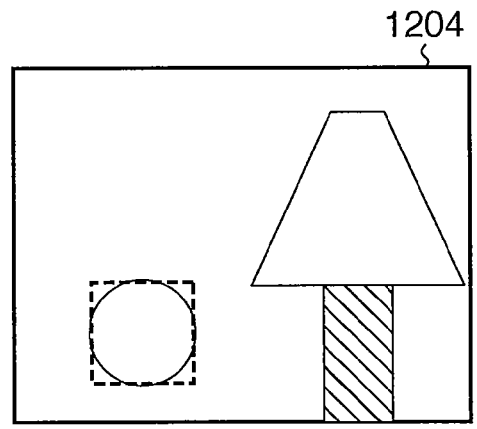

Referring back to FIG. 9, in step S904, the region correction unit 713 corrects the position of the specified region so that the detected misalignment reduces in accordance with its amount and direction. In step S905, the region correction unit 713 extracts the corrected, specified region as a subject region, as in a region surrounded by a rectangle which is indicated by a dotted line and shown in the subject extraction result image 1204 of FIG. 12D. The region correction unit 713 outputs the position information of the subject region to the control unit 105 and the image processing unit 106. The subject extraction result image 1204 shown in FIG. 12D is obtained by correcting the position of the specified region in the rightward direction.

Although the subject is extracted by determining the corrected, specified region as a subject region in the above-mentioned process, the following process may be performed. That is, a misalignment of the corrected, specified region is detected again by the misalignment detection unit 712, and, if a misalignment is detected, the specified region is corrected by the region correction unit 713 based on the amount and direction of detected misalignment. On the other hand, if no misalignment is detected, the specified region is extracted as a subject region intact. That is, processes by the misalignment detection unit 712 and region correction unit 713 are repeatedly executed until the misalignment stabilizes.

According to this embodiment, even if the specified region in the image and the position of the target subject in the image shift from each other, feature amounts are extracted from the specified region, a misalignment of the position of the target subject is detected from the distribution of feature pixels within the specified region, and the specified region is corrected. This makes it possible to extract the target subject region.

A subject region extraction apparatus which performs a process of extracting a subject region from an image has been described in this embodiment. However, the present invention may be applied to a subject tracking apparatus which extracts subject regions from images, that are sequentially supplied in time series, with reference to the subject region extraction result, and tracks the subject in time series. The subject can be tracked by, for example, registering the extracted subject region as a reference image, and extracting a region with a highest degree of correlation between the reference image and a partial region of the image that is sequentially supplied in series.

Other Embodiments

An image capturing apparatus as an example of a subject tracking apparatus has been described in each of the above-described embodiments. However, the present invention is applicable not only to an image capturing apparatus but also to a variety of devices, as described earlier. When the present invention is applied to, for example, an apparatus for playing back/displaying image data, applications such as setting of the playback condition or display condition of the image data using information on the subject region in the image data (for example, the position or size of the subject in the image) are possible. More specifically, information indicating the subject, such as a frame, can be displayed at the subject position in the image in a superimposed manner, and the display conditions such as the luminance and the color tone can be controlled so as to appropriately display the subject portion, in accordance with the luminance and color information of the subject portion.

Also, the above-described embodiments are merely examples, and the present invention is not limited to them. The configurations and operations in the above-described embodiments can be changed as needed. For example, the region correction unit 713 in the third embodiment may correct not only the subject region but also its size and shape. To correct the size of the subject region, for example, the distribution degree of feature pixels is determined on each side of the region, the position of which is corrected, in its outer circumferential direction, and a region including this side is extracted as a subject region if the distribution degree of feature pixels is relatively high. Also, the distribution degree of feature pixels is determined on each side of the region, the position of which is corrected, in its inner circumferential direction, and a region excluding this side is extracted as a subject region if the distribution degree of feature pixels is relatively low. This makes it possible to extract an appropriate subject region.

Moreover, the subject region extraction unit 710 according to the third embodiment may be provided in the image capturing apparatus 100 according to each of the first and second embodiments, and the subject region extracted in the third embodiment may be used as a reference image in each of the first and second embodiments.

In this case, in step S202, the reference image registration unit 111 can apply the region correction in the third embodiment to the partial region 301 specified by the subject specification unit 109 to obtain the initial reference image 302.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

Although the functional blocks in the accompanying drawings can be implemented by hardware, software, or a combination thereof, they need not always be provided with configurations for implementing them in one-to-one correspondence. A plurality of functional blocks may be implemented by one software or hardware module.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-289653, filed on Dec. 21, 2009 and 2009-293207, filed on Dec. 24, 2009, which are hereby incorporated by reference herein their entirety.

What is claimed is:

1. A subject tracking apparatus which tracks a specific subject in an image over a plurality of images input thereto in time series, comprising:
   a computation circuit configured to obtain, with respect to each of a plurality of reference images registered in registration unit, a maximum degree of correlation of the input image and a region which is included in the input image and has the maximum degree of correlation; and
   a first determination circuit configured to determine a region of the specific subject in the input image from the regions obtained by said computation circuit,
   wherein the plurality of reference images include a first reference image which is based on a region specified as the region of the specific subject in a first input image among the plurality of input images, and a second reference image which is based on a region determined as the region of the specific subject by said first determination circuit in a second input image, input to the subject tracking apparatus later than the first input image, among the plurality of input images, and
   said first determination circuit determines, without relying on a region with a maximum degree of correlation with the second reference image, that a region with a maximum degree of correlation with the first reference image is the region of the specific subject in the input image if the maximum degree of correlation obtained with respect to the first reference image by said computation circuit is not less than a predetermined threshold, and determines, based on the maximum degree of correlation obtained with respect of the first reference image and that obtained with respect to the second reference image, that either a region with a maximum degree of correlation with the first reference image or a region with a maximum degree of correlation with the second reference image is the region of the specific subject in the input image if the maximum degree of correlation obtained with respect to the first reference image by said computation circuit is less than the predetermined threshold.

2. The apparatus according to claim 1, further comprising:
   an extraction circuit configured to extract a feature amount of the first reference image;
   a second determination circuit configured to determine a degree of matching of the input image with the feature amount; and
   a setting circuit configured to set the predetermined threshold in accordance with the result of determination by said second determination circuit,
   wherein said setting circuit sets the threshold larger as the degree of matching of the input image with the feature amount is determined to be higher, and sets the threshold smaller as the degree of matching of the input image with the feature amount is determined to be lower.

3. The apparatus according to claim 2, wherein said extraction circuit generates a histogram of values of predetermined components of pixels included in the first reference image, and extracts a value with a frequency that is not less than a predetermined threshold.

4. The apparatus according to claim 3, wherein said second determination circuit counts the number of pixels, which match the feature amount, among pixels included in the input image, and determines a ratio of the number of pixels which match the feature amount to the total number of pixels in the entire input image as the degree of matching of the input image with the feature amount.

5. The apparatus according to claim 1, further comprising a specification circuit configured to specify a region in the input image,
wherein the region of the specific subject in the first input image is specified by a user via said specification circuit.

6. A control method for a subject tracking apparatus which tracks a specific subject in an image over a plurality of images input thereto in time series, comprising:
a computation step of obtaining, with respect to each of a plurality of reference images registered in registration unit, a maximum degree of correlation of the input image and a region which is included in the input image and has the maximum degree of correlation; and
a first determination step of determining a region of the specific subject in the input image from the regions obtained in the computation step,
wherein the plurality of reference images include a first reference image which is based on a region specified as the region of the specific subject in a first input image among the plurality of input images, and a second reference image which is based on a region determined as the region of the specific subject in the first determination step in a second input image, input to the subject tracking apparatus later than the first input image, among the plurality of input images, and
in the first determination step, it is determined, without relying on a region with a maximum degree of correlation with the second reference image, that a region with a maximum degree of correlation with the first reference image is the region of the specific subject in the input image if the maximum degree of correlation obtained with respect to the first reference image in the computation step is not less than a predetermined threshold, and it is determined, based on the maximum degree of correlation obtained with respect of the first reference image and that obtained with respect to the second reference image, that either a region with a maximum degree of correlation with the first reference image or a region with a maximum degree of correlation with the second reference image is the region of the specific subject in the input image if the maximum degree of correlation obtained with respect to the first reference image in the computation step is less than the predetermined threshold.

7. A computer-readable non-transitory recording medium recording a program for causing a computer to execute each step of a control method for a subject tracking apparatus, which is defined in claim 6.

8. The apparatus according to claim 1, wherein after determination of the region of the specific subject in the input image, the first determination circuit updates only the second reference image out of the first and second reference images based on the region determined as the region of the specific subject in the input image.

9. The method according to claim 6, further comprising:
an update step of updating, after determination of the region of the specific subject in the input image, only the second reference image out of the first and second reference images based on the region determined as the region of the specific subject in the input image.

* * * * *